Sept. 4, 1945. B. DICK 2,383,959
PISTON SEALING MEANS
Filed Jan. 7, 1944
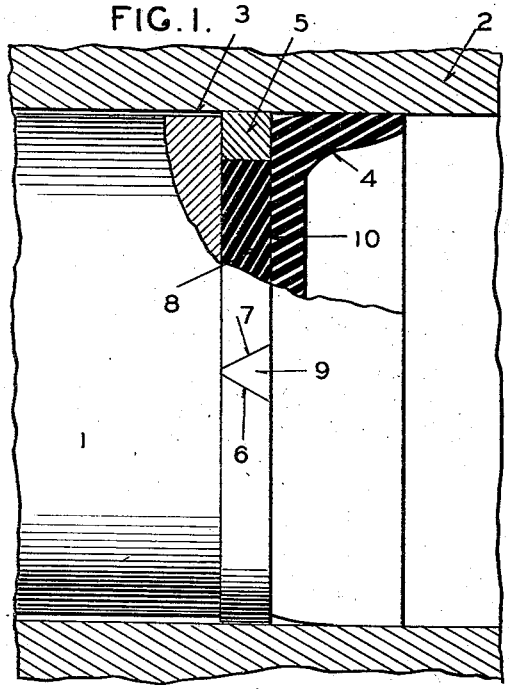
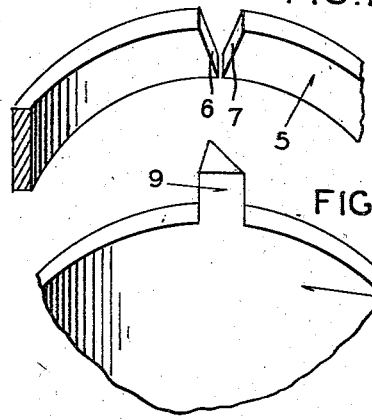
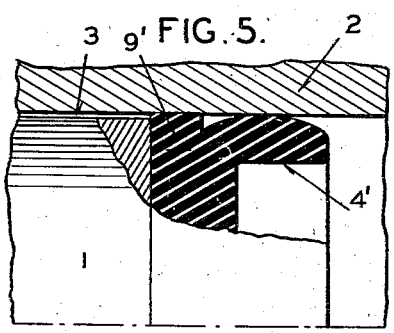
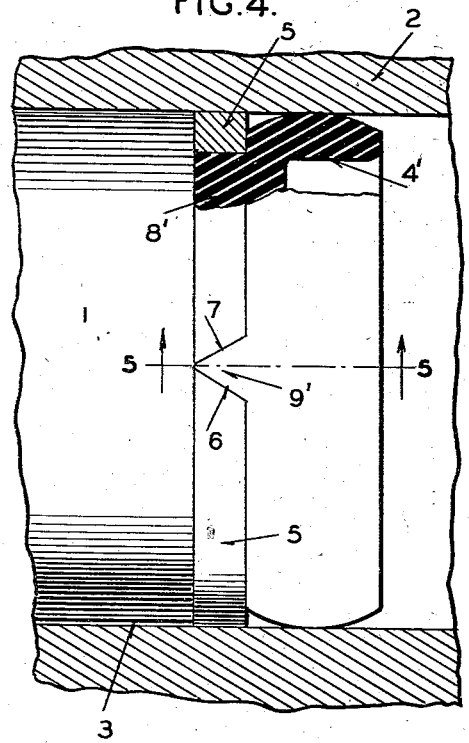
INVENTOR
BURNS DICK
BY
ATTORNEY Patented Sept. 4, 1945

2,383,959

UNITED STATES PATENT OFFICE 2,383,959

PISTON SEALING MEANS

Burns Dick, Ferguson, Mo., assignor to Wagner Electric Corporation, St. Louis, Mo., a corporation of Delaware Application January 7, 1944, Serial No. 517,356

11 Claims. (Cl. 309—33)

My invention relates to sealing means and more particularly to a sealing means for a piston and cylinder combination.

One of the objects of my invention is to provide improved sealing means between a piston and the wall of a cylinder in which it is reciprocable.

Another object of my invention is to provide means for association with a piston and a yieldable sealing cup therefor for preventing the material of the cup from being damaged as a result of being forced into the clearance space between the piston and cylinder wall by fluid under pressure acting on the cup.

Other objects of my invention will become apparent from the following description taken in connection with the accompanying drawing in which Figure 1 is a view partially in section of a piston, cylinder, and sealing cup having structure embodying my invention associated therewith; Figure 2 is a view showing the construction of the split ring; Figure 3 is a view of a part of the filler member for the split ring; Figure 4 is a view of another construction; and Figure 5 is a sectional view taken on the line 5—5 of Figure 4.

In fluid pressure systems which employ a piston and cylinder combination a yieldable packing cup is generally associated with the head of the piston and usually made of rubber, synthetic rubber, or a rubber compound. In order that the piston may properly move within the cylinder, a clearance is provided between the piston and cylinder wall which increases as the piston and the cylinder wall wear. When this construction is subjected to fluid pressure, the material of the cup will flow and extrusion will occur, thereby causing the material to enter the clearance space between the piston and the cylinder wall. The amount of extrusion will depend upon the material and the fluid pressure effective thereon. When the pressure of the fluid is relieved to permit the return movement of the piston, it often happens that this extruded portion of the cup may be "chewed" or sheared off. Also, if the resiliency of the material has decreased, particles of the material may drop off the extruded part of the cup. Since the piston and cylinder combination is often subject to considerable heat, softening of the rubber will also take place, thus permitting the cup to be more easily extruded into the clearance space between the piston and the cylinder wall. The "cutting" or "chewing" of the cup may happen frequently, thus sometimes causing a complete failure of the sealing action of the cup by cutting said cup completely through its wall. In accordance with my invention, I have provided means which will prevent any portion of the cup from being extruded or forced into the clearance between the piston and the cylinder wall, thus eliminating the possibility of the cup being damaged in a manner set forth.

Referring to the drawing and first to Figures 1 to 3, numeral 1 indicates a piston which is adapted for sliding movement in cylinder 2. In order to operate freely in the cylinder, the piston has a clearance therewith which is shown exaggerated in the drawing and indicated by the numeral 3. This clearance will vary considerably depending upon the type of material used for the piston and cylinder, the newness of the parts, and also whether the cylinder has been honed. In order that the packing cup 4, molded of rubber, synthetic rubber, or other suitable material and associated with the head of the piston to seal the piston and cylinder, will be prevented from being forced into the clearance 3, a split ring 5 is provided of metal or other material such as synthetic compounds. This split ring is of rectangular cross-section in order to have a peripheral cylindrical surface for engaging the wall of the cylinder and one edge surface thereof for engaging the surface of the head of the piston adjacent its periphery. The relation of this split ring with the piston and cylinder "blocks off" the clearance space and prevents the cup from being forced into this clearance and damaged in a manner already noted. However, with the split ring a space will result between the ends of the ring into which the material of the cup can be forced and if no provision is made for filling this space, it will result in the cup being damaged.

To prevent this I provide the ends of the split ring with surfaces 6 and 7 which are preferably arranged to diverge in the axial direction away from the head of the piston. The split ring has a disc member 8 positioned therein, preferably of yieldable material such as rubber or the like, said disc being the same thickness as that of the ring. The disc has a diameter slightly greater than the internal diameter of the split ring when the ring is positioned in the cylinder and fully engages the cylinder wall. This results in the material of the disc being deformed slightly by the ring when they are positioned in the cylinder and consequently the disc will apply some expanding pressure to the ring and cause it to have some normal pressure engagement with the cylinder wall even though the ring may not be resilient. Integral with this disc is a radial projection 9 shaped in the form of a wedge and of such size as to fill the space between the ends of the split ring and cooperate with the diverging surfaces thereof. When positioned in cooperation with the ring, the disc and the wedge-shaped projection with the ring present a flat surface against which the flat surface 10 of the base of the cup can engage.

From the foregoing it is seen that the split ring and the filler disc 8 with the wedge-shaped projection 9 so cooperate with each other and with the wall of the cylinder that the clearance between the piston and the cylinder wall is completely "blocked off" and no opening is presented into which the material of the cup can be forced to result in "cutting" and "chewing" of the cup material. The arrangement also insures the split ring being in slight pressure engagement with the cylinder wall. When piston 1 is moved forwardly to compress any fluid ahead of the piston or when fluid ahead of the piston is under pressure to move the piston, the fluid under pressure will act through cup 4 on the disc and the wedge-shaped projection. Consequently the material of the disc and wedge will be deformed somewhat, thereby insuring that the split ring will have an increasing expanding pressure transmitted thereto and the wedge-shaped member forced between the ends of the split ring not only to fill this space but also to place a slight expanding pressure on the ring by a wedging action. This wedging action increases the pressure of the ring against the cylinder wall and eliminates any crevice into which the material of the cup can be extruded and damaged. As a result the life of the cup will be greatly extended. Tests have shown that with the construction described a packing cup will be little damaged after a considerable period of operation whereas the same cup operating for a like period of time without the split ring and disc construction interposed between it and the piston will show considerable damage.

Figures 4 and 5 show a slightly modified construction wherein the disc and its wedge-shaped projection are formed integral with the packing cup, the two elements being formed by a single molding operation. As shown in these figures, the packing cup 4' has the filler disc 8' molded as an integral cylindrical extension on the base thereof with the wedge-shaped projection 9' integral with both the disc portion and the body of the cup. The operation of the structure is identical with that described in connection with the structure shown in Figures 1 to 3. The split ring 5 blocks off the clearance 3 between piston 1 and cylinder 2. the filler extension 8' fills the space between the ring, and the wedge-shaped projection 9' fills the space between the ends of the split ring and so cooperates with the diverging surfaces 6 and 7 thereof as to apply a slight expanding force to the ring.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a cylinder, a piston therein, a packing member associated with the piston head and the cylinder wall, a split ring having a cross-sectional shape to engage the cylinder wall and the piston head surface adjacent its periphery, said ring being positioned between the piston head and the packing member, and yieldable material concentrically disposed in said ring having a portion thereof interposed between the adjacent ends of the ring.

2. In apparatus of the class described, a cylinder, a piston therein, a packing member associated with the piston head and the cylinder wall, a split ring having a cross-sectional shape to engage the cylinder wall and the piston head surface adjacent its periphery, said ring being positioned between the piston head and the packing member, and yieldable material concentrically disposed in said ring having a portion thereof interposed between the adjacent ends of the ring and filling the space within the ring.

3. In apparatus of the class described, a cylinder, a piston therein, a split ring having a cross-sectional shape to engage the cylinder wall and the piston head surface adjacent its periphery, a packing member having a peripheral portion engaging the cylinder wall ahead of the ring and a base portion cooperating with the piston head surface within the ring, and yieldable material concentrically disposed in said ring having a portion thereof interposed between the adjacent ends of the ring.

4. In apparatus of the class described, a cylinder, a piston therein, a packing member associated with the piston head and the cylinder wall, a split ring positioned between the packing member and piston head and engageable with the cylinder wall, the ends of said ring being positioned adjacent each other, and yieldable material concentrically disposed in said ring having a portion thereof filling the space between the ends of the ring and so associated with the packing member that when fluid under pressure acts thereon the yieldable material will be placed under pressure and cause an expanding force to act on the ring.

5. In apparatus of the class described, a cylinder, a piston therein, a packing member associated with the piston head and the cylinder wall, a split ring having a cylindrical external surface for engaging the cylinder wall and an edge surface at right angles to its axis for engaging the piston head surface adjacent its periphery, said ring being positioned between the piston head and the packing member, and yieldable material concentrically disposed in said ring having a portion thereof interposed between the adjacent ends of the ring and filling the space within the ring.

6. In apparatus of the class described, a cylinder, a piston therein, a split ring engaging the cylinder wall and the head of the piston adjacent its periphery, a disc of yieldable material filling the space within the ring, said disc having a portion filling the space between the ends of the split ring, and a packing member having a flat base for cooperation with the ring and disc.

7. In apparatus of the class described, a cylinder, a piston therein, a split ring engaging the cylinder wall and the head of the piston adjacent its periphery, the ends of said ring being provided with surfaces diverging in an axial direction away from the piston, a disc of yieldable material filling the space within the ring and provided with an integral portion on its periphery filling the space between the diverging surfaces on the ends of the split ring, and a packing member of yieldable material having a flat base for cooperation with the ring and disc.

8. In apparatus of the class described, a cylinder, a piston therein having a clearance with respect to the cylinder wall, a packing member associated with the piston head and the cylinder wall, and means for preventing the material of the packing member from being forced by fluid under pressure into the clearance space, said means comprising a split ring positioned between the head of the piston and the packing member and engageable with the cylinder wall and yieldable material filling the space within the ring and having an extension filling the space between the ends of the ring.

9. In apparatus of the class described, a cylinder, a piston therein, a split ring engaging the cylinder wall and the head of the piston adjacent its periphery, and a packing member of yieldable material having a peripheral portion engaging the cylinder wall and an integral portion filling the space within the ring and the space between the ends of the split ring.

10. In apparatus of the class described, a cylinder, a piston therein, a split ring engaging the cylinder wall and the head of the piston adjacent its periphery, the ends of said ring being provided with surfaces diverging in an axial direction away from the piston, and a packing cup of yieldable material having a peripheral portion engaging the cylinder wall and an integral portion filling the space within the ring and the space between the diverging surfaces on the ends of the split ring.

11. In apparatus of the class described, a cylinder, a piston therein, a split ring of rectangular cross-section with its outer cylindrical surface engaging the cylinder wall and an edge surface engaging the head of the piston adjacent its periphery, the ends of said ring being provided with surfaces diverging in an axial direction away from the piston, and a packing cup of yieldable material having a lip portion for engaging the cylinder wall, an integral cylindrical portion on its base filling the space within the ring and an integral radial projection on said cylindrical portion filling the space between the diverging surfaces on the ends of the split ring.

BURNS DICK.